United States Patent [19]
Slangan et al.

[11] 3,991,214
[45] Nov. 9, 1976

[54] FLAVORING COMPOSITION FOR FOODSTUFF OR CHEWING GUM CONTAINING 2-PHENYL-3-CARBOETHOXYFURAN AND PROCESS FOR FLAVORING

[75] Inventors: Gary Slangan, Toms River; Alan O. Pittet, Atlantic Highlands; Christopher Giacino, Califon; Denis E. Hruza, Sr., Bricktown, all of N.J.; Edward J. Shuster, Brooklyn, N.Y.

[73] Assignee: International Flavors & Fragrances Inc., New York, N.Y.

[22] Filed: Aug. 12, 1975

[21] Appl. No.: 604,054

Related U.S. Application Data

[63] Continuation-in-part of Ser. No. 518,818, Oct. 29, 1974, Pat. No. 3,917,870, which is a continuation-in-part of Ser. No. 401,665, Sept. 28, 1973, abandoned.

[52] U.S. Cl............................ 426/3; 426/536; 131/17 R
[51] Int. Cl.².................... A23L 1/226; A23L 1/235
[58] Field of Search............... 426/536, 3

[56] References Cited
UNITED STATES PATENTS
3,702,253   11/1972   Winter et al................ 426/536 X

*Primary Examiner*—Joseph M. Golian
*Attorney, Agent, or Firm*—Arthur L. Liberman; Harold Haidt; Franklin D. Wolffe

[57] ABSTRACT

Methods for preparing tobaccos, medicinal products, chewing gums, foodstuffs and flavoring compositions for tobaccos, chewing gums, foodstuffs and medicinal products by including therein 2-phenyl-3-carboethoxyfuran to produce a. In chewing gum, medicinal product and foodstuff flavorings, concord grape, wine, pungent, weak sweet buttery, sweet carrot, dry woody cinnamon or warm benzaldehydenut like flavor notes or combinations of these and bitter after taste, benzoateester taste and heavy floral backnotes for improving the taste and aroma of artificial grape or other fruit flavoring compositions;

b. In tobacco flavorings, aromatic, sweet, resinous and balsamic-like notes as well as the foodstuff flavoring compositions, perfume compositions and tobacco compositions containing 2-phenyl-3-carboethoxyfuran.

2-Phenyl-3-carboethoxyfuran has the structure:

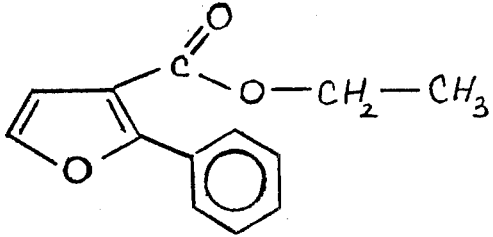

2 Claims, No Drawings

FLAVORING COMPOSITION FOR FOODSTUFF OR CHEWING GUM CONTAINING 2-PHENYL-3-CARBOETHOXYFURAN AND PROCESS FOR FLAVORING

This application is a continuation-in-part of U.S. application for letters Pat. Ser. No. 518,818 filed on Oct. 29, 1974 now U.S. Pat. No. 3,917,870, issued on Nov. 4, 1975 which, in turn, is a continuation-in-part of U.S. application for letters Pat. Ser. No. 401,665 filed on Sept. 28, 1973, now abandoned.

BACKGROUND OF THE INVENTION

The present invention relates to novel methods and compositions using 2-phenyl-3-carboethoxyfuran to alter, modify or enhance the flavor and/or aroma of certain consumable materials.

There has been considerable work performed relating to substances which can be used to impart (or enhance) flavors to (or in) various consumable materials. These substances are used to diminish natural materials, some of which may be in short supply, and to provide more uniform properties in the finished product. Concord grape, wine, pungent, weak sweet buttery, sweet carrot, dry woody cinnamon or warm benzaldehyde-nut like flavor notes or combinations or these and bitter after taste, benzoate-ester taste and heavy floral backnotes for improving the taste and aroma of artificial grape or other fruity flavoring compositions are particularly desirable for many uses in consumable articles, e.g., foodstuffs. Aromatic, sweet, resinous and balsamic-like notes are particularly desirable in tobacco.

As mentioned on page 442 of "The Chemistry and Physiology of Flavors" (Schultz, Day and Libbey, Avi Publishing Company, 1967), 2-acetylfuran is present in coffee flavors. On pages 218 and 219 of the same publication, ethyl phenyl acetate and 2-phenethyl caproate are mentioned as being one of the volatile esters of wine aroma.

2-Phenyl-3-carboethoxyfuran is prepared according to the process set forth by I. H. Kondo and H. Suzuki in J. Pharm. Soc. Japan No. 544, 501–5 (1927).

THE INVENTION

It has now been discovered that novel solid and liquid foodstuffs, chewing gums, medicinal products and flavoring compositions therefor having concord grape, wine, pungent, weak sweet buttery, sweet carrot, dry woody cinnamon or warm benzaldehyde-nut like flavor notes or combinations of these and bitter after taste, benzoate-ester taste and heavy floral backnotes for improving the taste and aroma of artificial grape or other fruit flavoring compositions; and novel tobacco flavors having an aromatic, sweet, resinous and balsamic-like note can be created by the utilization of 2-phenyl-3-carboethoxyfuran in flavor formulae, and/or in foodstuffs, chewing gums, tobaccos and medicinal products.

When used as a food flavor or food additive or enhancer, either separately or in combination, the organoleptic properties of the 2-phenyl-3-carboethoxyfuran of our invention are described as follows:

"At 1 ppm has a weak, sweet, buttery taste; at 2 ppm has a sweet carrot and concord grape-like taste; at 5 ppm has a characteristic benzoate-ester taste. At 20 ppm has an Italian Spumoni-like character; and a sweet, warm benzaldehyde nut-like aroma with a heavy floral backnote."

When the 2-phenyl-3-carboethoxyfuran of our invention is used as a food flavor adjuvant, the nature of the coingredients included with the said 2-phenyl-3-carboethoxyfuran in formulating the product composition will also serve to alter, modify or enhance the organoleptic characteristics of the ultimate foodstuffs treated therewith.

As used herein in regard to flavors, the terms "alter" and "modify" in their various forms means "supplying or imparting flavor character or note to otherwise bland, relatively tasteless substances or augmenting the existing flavor characteristic where a natural flavor or synthetic flavor or mixture of natural and synthetic flavors is deficient in some regard, or supplementing the existing flavor impression to modify its quality, character or taste."

As used herein, the term "enhance" is intended to mean the intensification (without effecting a change in kind of quality of aroma or taste) of one or more taste and/or aroma nuances present in the organoleptic impression of a consumable material, e.g. foodstuff, chewing gum or medicinal product.

As used herein the term "foodstuff" includes both solid and liquid ingestible materials which usually do, but need not, have nutritional value. Thus, foodstuffs include soups, convenience foods, beverages, dairy products, candies, vegetables, cereals, soft drinks, snacks and the like.

As used herein the term "chewing gum" is intended to mean a composition which comprises a substantially water-insoluble, chewable plastic gum base such as chicle, or substitutes therefor, including jelutung, guttakay rubber and/or certain comestible natural or synthetic resins or waxes. Incorporated within the gum base, in admixture therewith may be plasticizers or softening agents, e.g. glycerine; and a flavoring composition which incorporates the 2-phenyl-3-carboethoxyfuran of our invention, and, in addition, sweetening agents which may be sugars, including sucrose or dextrose and/or artificial sweeteners including dipeptides, cyclamates and saccharin. Other optional ingredients may also be present.

The term "medicinal product" includes both solids and liquids which are ingestible, non-toxic materials having medicinal value such as cough syrups, cough drops, toothpaste, aspirin and chewable medicinal tablets as further exemplified herein.

Substances suitable for use herein as co-ingredients or flavoring adjuvants are well known in the art for such use being extensively described in the relevant literature. Such material is required to be "ingestibly" acceptable and thus non-toxic or otherwise non-deleterious. Particularly critical is the additional requirement that such material be organoleptically compatible with the 2-phenyl-3-carboethoxyfuran encompassed within the scope of our invention. Also critical is the additional requirement that such material be nonreactive (within the range of storage conditions and room temperature use conditions) with the 2-phenyl-3-carboethoxyfuran.

Accordingly, such materials which may in general be characterized as flavoring adjuvants or vehicles comprise broadly stabilizers, thickeners, surface active agents, conditioners, other flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2- and 3-tertiary-butyl-4-hydroxyanisole), butylated hydroxy toluene (2,6-di-tertiary-butyl-4-methyl phenol), propyl gallate and the like, and sequestrants, e.g., citric acid.

Thickener compounds include carriers, binders, protective colloids, suspending agents, emulsifiers and the like, e.g., agaragar; carrageenan; cellulose; and cellulose derivatives such as carboxymethyl cellulose and methyl cellulose; natural and synthetic gums such as gum arabic; gum tragacanth; gelatin, proteinaceous materials; lipids; carbohydrates; starches pectins, and emulsifiers, e.g., mono-and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono-and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcumin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources, such as zinc chloride, zinc sulfate and the like.

Other flavorants and flavor intensifiers include organic acid, e.g., fatty saturated acids, unsaturated acids and amino acids; alcohols, e.g., primary and secondary alcohols, esters; carbonyl compounds, e.g., aldehydes and ketones as well as lactones; cyclic organic materials including benzene derivatives isocyclics, heterocyclics such as furans particularly 2,5-dimethyl-3-acetyl furan and 2-methyl-2,3-dihydro furan-3-one, pyridines, pyrazines (particularly monoalkyl, dialkyl, trialkyl and tetraalkyl substituted pyrazines) and the like, sulfur-containing materials including thiazoles, disulfides, thiols, sulfides, aldehydes (for example, 3-phenyl-4-pentenal, 3-phenyl-3-pentenal, 3-phenyl-2-pentenal, 2-phenyl-2-pentenal, and 2-phenyl-3-methyl-2-butenal); trisulfides and the like; other flavor potentiators such as monosodium glutamate, guanylates, inosinates, natural and synthetic flavorants such as vanillin, ethyl vanillin, diacetyl, phenethyl-2-furoate, maltol, natural gums and the like; spices, herbs, essential oils and extractives including "bitterness principles" such as theobromine, caffeine, naringin and other suitable materials creating a bitter effect.

The specific flavoring adjuvant selected for use may be either solid or liquid depending upon the desired physical form of the ultimate product, i.e., foodstuff, whether simulated or natural, and should, in any event, be capable of providing an environment in which the 2-phenyl-3-carboethoxyfuran can be dispersed or admixed to provide a homogeneous medium. In addition, selection of one or more flavoring adjuvants as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 2-phenyl-3-carboethoxyfuran employed in a particular instance can vary over a relatively wide range whereby to its desired organoleptic effects. All parts and percentages given herein are by weight unless otherwise specified. Thus, correspondingly, greater amounts would be necessary in those instances wherein the ultimate food composition to be flavored is relatively bland to the taste, whereas relatively minor quantities may suffice for purposes of enhancing the composition merely deficient in natural flavor or aroma. Thus, the primary requirement is that the amount selected to be effective, i.e., sufficient to alter the organoleptic characteristics of the parent composition, whether foodstuff per se or flavoring composition. Thus, the use of insufficient quantities of 2-phenyl-3-carboethoxyfuran will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions it has been found that quantities of 2-phenyl-3-carboethoxyfuran ranging from a small but effective amount, e.g., 0.02 parts per billion up to about 0.1 percent (1000 parts per million) by weight based on total composition are suitable. Concentrations in excess of the maximum quantity stated are not normally recommended since they fail to provide commensurate enhancement of organoleptic properties. In those cases, wherein the 2-phenyl-3-carboethoxyfuran is added to the foodstuff as an integral component of the flavoring composition, it is, of course, essential that the total quantity of flavoring composition employed be sufficient to yield an effective 2-phenyl-3-carboethoxyfuran concentration in the foodstuff product.

Food flavoring compositions prepared in accordance with the present invention preferably contain 2-phenyl-3-carboethoxyfuran in concentrations ranging from about 0.0006 percent up to about 10 percent by weight based on a total weight of said flavoring composition.

The compositions described herein can be prepared according to conventional techniques well known as typified by cake batters and fruit juices and vegetable juices and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the 2-phenyl-3-carboethoxyfuran with for example gum arabic, gum tragacanth, carrageenan and the like and thereafter spraydrying the resultant mixture whereby to obtain the particular solid product. Pre-prepared flavor mixes in powder form, e.g., a red currant mix or a fruit flavored powder obtained by mixing dried solid components, e.g., starch, sugar and the like and 2-phenyl-3-carboethoxyfuran in a dry blender until the requisite degree of uniformity is achieved.

It is presently preferred to combine the 2-phenyl-3-carboethoxyfuran with the following adjuvants:
Methyl anthranilate;
Ethyl acetate;
Ethyl anthranilate;
Ethyl butyrate;
Ethyl methyl phenyl glycidate;
Cinnamic alcohol;
Amyl valerianate;
Cinnamyl propionate;
Rhodinyl acetate;
Methyl beta-hydroxy butyrate; and
Ethyl beta-hydroxy butyrate An additional aspect of our invention provides an organoleptically improved smoking tobacco product and additives thereof, as well as methods of making the same which overcome specific problems heretofore encountered in which specific desired sweet and resinous, balsamic flavor characteristics of natural tobacco are created or enhanced and may be readily controlled and maintained at the desired uniform level regardless of variations in the tobacco components of the blend.

This invention further provides improved tobacco additives and methods whereby desirable sweet and resinous, balsamic flavor characteristics may be imparted to smoking tobacco products and may be readily varied and controlled to produce the desired uniform flavoring characteristics.

In carrying out this aspect of our invention, we add to smoking tobacco materials or a suitable substitute therefor (e.g., dried lettuce leaves) an aroma and flavor additive containing as an active ingredient, 2-phenyl-3-carboethoxyfuran.

In addition to the 2-phenyl-3-carboethoxyfuran of our invention other flavoring and aroma additives may be added to the smoking tobacco material or substitute therefor either separately or in mixture with the 2-phenyl-3-carboethoxyfuran as follows:

I. SYNTHETIC MATERIALS

Beta-ethyl-cinnamaldehyde;
Eugenol;
Dipentene;
Damascenone;
Maltol;
Ethyl maltol;
Delta undecalactone;
Delta decalactone;
Benzaldehyde;
Amyl acetate;
Ethyl butyrate;
Ethyl valerate;
Ethyl acetate;
2-Hexenol-1,2-methyl-5-isopropyl-1,3-nonadiene-8-one;
2,6-Dimethyl-2,6-undecadiene-10-one;
2-Methyl-5-isopropyl acetophenone;
2-Hydroxy-2,5,58a-tetramethyl-1-(2-hydroxyethyl)-decahydronaphthalene;
Dodecahydro-3a-6,6,9a-tetramethyl naphtho-(2,1-b)-furan;
4-Hydroxy hexanoic acid, gamma lactone;
Polyisoprenoid hydrocarbons defined in Example V of U.S. Pat. No. 3,589,372 issued on June 29, 1971.

II. NATURAL OILS

Celery seed oil;
Coffee extract;
Bergamot oil;
Cocoa extract;
Nutmeg oil;
Origanum oil.

An aroma and flavoring concentrate containing 2-phenyl-3-carboethoxyfuran and, if desired, one or more of the above indicated additional flavoring additives may be added to the smoking tobacco material, to 0.60 filter or to the leaf or paper wrapper. The smoking tobacco material may be shredded, cured, cased and blended tobacco material or reconstituted tobacco material or tobacco substitutes (e.g., lettuce leaves) or mixtures thereof. The proportions of flavoring additives may be varied in accordance with taste but insofar as enhancement or the imparting of sweet and resinous, balsamic-like notes, we have found that satisfactory results are obtained if the proportion by weight of the sum total of 2-phenyl-3-carboethoxyfuran to smoking tobacco material is between 100 ppm and 6000 ppm (0.01–0.060 percent) of the active ingredients to the smoking tobacco material. We have further found that satisfactory results are obtained if the proportion by weight of the sum total of 2-phenyl-3-carboethoxyfuran used to flavoring material is between 0.005 and 0.60.

Any convenient method for incorporating the 2-phenyl-3-carboethoxyfuran in the tobacco product may be employed. Thus, the 2-phenyl-3-carboethoxyfuran taken alone or along with other flavoring additives may be dissolved in a suitable solvent such as ethanol, pentane, diethyl ether and/or other volatile organic solvents and the resulting solution may either be spread on the cured, cased and blended tobacco material or the tobacco material may be dipped into such solution. Under certain circumstances, a solution of 2-phenyl-3-carboethoxyfuran taken alone or taken further together with other flavoring additives as set forth above, may be applied by means of a suitable applicator such as a brush or roller on the paper or leaf wrapper for the smoking product, or it may be applied to the filter by either spraying, or dipping, or coating.

Furthermore, it will be apparent that only a portion of the tobacco or substitute therefor need be treated and the thus treated tobacco may be blended with other tobaccos before the ultimate tobacco product is formed. In such cases, the tobacco treated may have the 2-phenyl-3-carboethoxyfuran in excess of the amounts or concentrations above indicated so that when blended with other tobaccos, the final product will have the percentage within the indicated range.

In accordance with one specific example of our invention an aged, cured and shredded domestic burley tobacco is spread with a 20 percent ethyl alcohol solution of 2-phenyl-3-carboethoxyfuran in an amount to provide a tobacco composition containing 800 ppm by weight of 2-phenyl-3-carboethoxyfuran on a dry basis. Thereafter, the alcohol is removed by evaporation and the tobacco is manufactured into cigarettes by the usual techniques. The cigarette when treated as indicated has a desired and pleasing aroma which is detectable in the main and side streams when the cigarette is smoked. This aroma is described as being sweeter, rich, less harsh and having sweet, resinous, balsamic-like notes.

While our invention is particularly useful in the manufacture of smoking tobacco, such as cigarette tobacco, cigar tobacco, and pipe tobacco, other tobacco products formed from sheeted tobacco dust or fines may also be used. Likewise, the 2-phenyl-3-carboethoxyfuran of our invention can be incorporated with materials such as filter tip materials, seam paste, packaging materials and the like which are used along with tobacco to form a product adapted for smoking. Furthermore, the 2-phenyl-3-carboethoxyfuran can be added to certain tobacco substitutes of natural or synthetic origin (e.g., dried lettuce leaves) and, accordingly, by the term "tobacco" as used throughout this specification is meant any composition intended for human consumption, by smoking or otherwise, whether composed of tobacco plant parts or substitute materials or both.

The following examples are given to illustrate embodiments of the invention as it is presently preferred to practice it. It will be understood that these examples are illustrative, and the invention is not to be considered as restricted thereto except as indicated in the appended claims.

EXAMPLE I

The following mixture is prepared:

| Ingredients | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | 0.3 |
| Cognac oil | 0.1 |
| Ethyl alcohol | 73.6 |

The above mixture is judged to be an acceptable grape flavor when evaluated in a sweetened and acidified aqueous tasting solution. 1.5 Parts of 2-phenyl-3-carboethoxyfuran is added to the above flavor and a significant improvement in aroma and taste is noted. When this is evaluated in the aforementioned tasting solution, it is judged to have an improved grape character and grape fidelity. It contains more fresh concord grape character, true fruitiness with a nuance of wine. In addition, it is judged to be a more rounded and natural flavor, superior to the product made without the addition of 2-phenyl-3-carboethoxyfuran in both aroma and taste.

EXAMPLE II

The following materials are separately added to the grape flavor formulation set forth infra:
a. Cyclohexyl mercaptan having the structure:

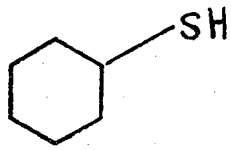

(U.S. Pat. No. 3,677,772; Mussinan)
b. Furfuryl valerate having the structure:

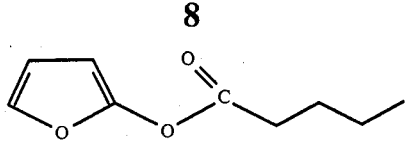

c. 2-Phenyl-3-carboethoxyfuran having the structure:

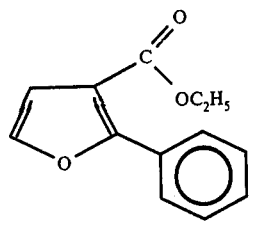

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 50 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:
a. Reconstituted grape juice containing material (a): At the levels added material (a) is detrimental to the grape flavor and gives it a meaty quality.
b. Reconstituted grape juice containing material (b): At the levels added material (b) is detrimental to the grape flavor and gives it a meaty quality.
c. Reconstituted grape juice with formulation containing (c) added: The natural grape juice and the reconstituted grape juice containing the formulation with (c) added are substantially familiar and substantially more flavorful than the reconstituted grape juice to which the essence alone is added.

CONCLUSIONS

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE III

The following materials are separately added to the grape flavor formulation set forth supra:

a. Cyclohexyl mercaptan having the structure:

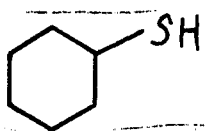

(U.S. Pat. No. 3,677,772; Mussinan)

b. Furfuryl valerate having the structure:

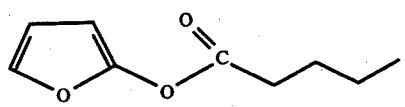

(U.S. Pat. No. 3,702,253; Winter et al.)

c. 2-Phenyl-3-carboethoxyfuran having the structure:

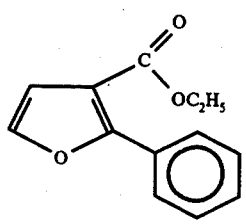

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 300 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a): At the levels added material (a) is detrimental to the grape flavor and gives it a meaty quality.

b. Reconstituted grape juice containing material (b): At the levels added material (b) is detrimental to the grape flavor and gives it a meaty quality.

c. Reconstituted grape juice with formulation containing (c) added: The natural grape juice and the reconstituted grape juice containing the formulation with (c) added are substantially familiar and substantially more flavorful than the reconstituted grape juice to which the essence alone is added.

CONCLUSIONS

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE IV

The following materials are separately added to the grape flavor formulation set forth supra:

a. Cyclohexyl mercaptan having the structure:

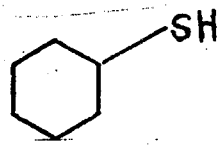

(U.S. Pat. No. 3,677,772; Mussinan)

b. Furfuryl valerate having the structure:

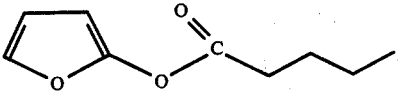

(U.S. Pat. No. 3,702,253; Winter et al.)

c. 2-Phenyl-3-carboethoxyfuran having the structure:

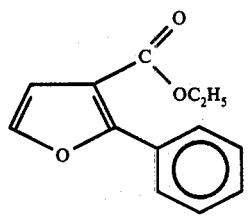

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 0.5 percent in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:
a. Reconstituted grape juice containing material (a): At the levels added material (a) is detrimental to the grape flavor and gives it a meaty quality.
b. Reconstituted grape juice containing material (b): At the levels added material (b) is detrimental to the grape flavor and gives it a meaty quality.
c. Reconstituted grape juice with formulation containing (c) added: The natural grape juice and the reconstituted grape juice containing the formulation with (c) added are substantially familiar and substantially more flavorful than the reconstituted grape juice to which the essence alone is added.

CONCLUSIONS

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE V

The following materials are separately added to the grape flavor formulation set forth supra:
a. Cyclohexyl mercaptan having the structure:

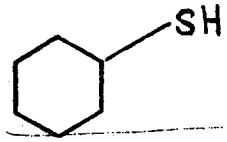

(U.S. Pat. No. 3,677,772; Mussinan)
b. Furfuryl valerate having the structure:

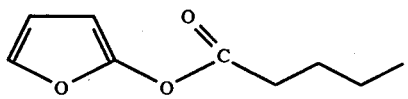

(U.S. Pat. No. 3,702,253; Winter et al.)
c. 2-Phenyl-3-carboethoxyfuran having the structure:

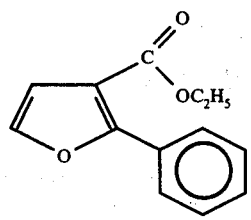

GRAPE FLAVOR FORMULATION:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 1 percent in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:
a. Reconstituted grape juice containing material (a): At the levels added material (a) is detrimental to the grape flavor and gives it a meaty quality.
b. Reconstituted grape juice containing material (b): At the levels added material (b) is detrimental to the grape flavor and gives it a meaty quality.
c. Reconstituted grape juice with formulation containing (c) added: The natural grape juice and the reconstituted grape juice containing the formulation with (c) added are substantially familiar and substantially more flavorful than the reconstituted grape juice to which the essence alone is added.

CONCLUSIONS

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

CONCLUSIONS

Comparing (a), (b), (c), (d), (e) and (f), the materials which give rise to advantageous results when added to reconstituted grape juice or grape juice per se are materials (c), (d), (e) and (f). Materials (c), (d), (e) and (f) have unexpected, unobvious and advantageous qualities insofar as grape flavor is concerned when compared with the organoleptic properties of materials (a) and (b).

EXAMPLE VI

20 Grams of the flavor formulation of Example I is emulsified in a solution containing 100 gms gum arabic and 300 gms water. The emulsion is spray-dried with a Bowen Lab Model Drier utilizing 250 c.f.m. of air with

EXAMPLE VII

CHEWING GUM

100 Parts by weight of chicle are mixed with 4 parts by weight of the flavor prepared in accordance with Example VI, 300 parts of sucrose and 100 parts of corn syrup are added. Mixing is effected in a ribbon blender with jacketed side walls of the type manufactured by the Baker Perkins Company. The resulting material is formed into 1/6 1 inch × 3 inch × 0.1 inch slabs. Each slab of chewing gum has an excellent long lasting grape flavor.

EXAMPLE VIII

A tobacco blend is made up by mixing the following materials:

| Ingredient | Parts by Weight |
| --- | --- |
| Bright | 40.1 |
| Burley | 24.9 |
| Maryland | 1.1 |
| Turkish | 11.6 |
| Stem (flue-cured) | 14.2 |
| Glycerine | 2.8 |
| Water | 5.3 |

The above tobacco is used in producing cigarettes and the following formulation is compounded and incorporated into each of these cigarettes:

| Ingredient | Parts by Weight |
| --- | --- |
| Ethyl butyrate | .05 |
| Ethyl valerate | .05 |
| Maltol | 2.00 |
| Cocoa Extract | 26.00 |
| Coffee Extract | 10.00 |
| Ethyl alcohol | 20.00 |
| Water | 41.90 |

The above flavor is incorporated into a model cigarette at 1–2 percent. Half of these model cigarettes are treated with the 2-phenyl-3-carboethoxyfuran at 100 to 300 ppm per cigarette. When evaluated by paired comparison the cigarettes treated with the 2-phenyl-3-carboethoxyfuran is found to be more aromatic and richer in aroma, i.e., having a well pronounced, pleasant, full aroma, sweet and persistant resinous balsamic-like character. In smoking, the cigarettes treated with the 2-phenyl-3-carboethoxyfuran are found to be more aromatic, sweeter and slightly less harsh.

What is claimed is:

1. A process for augmenting or enhancing the aroma or taste of a foodstuff or chewing gum comprising the step of adding thereto from 0.02 parts per billion up to about 0.1 percent by weight based on the total composition of 2-phenyl-3-carboethoxyfuran.

2. A flavor modifying composition consisting essentially of (i) from about 0.0006 percent up to about 10 percent by weight based on the total weight of said flavoring composition of 2-phenyl-3-carboethoxyfuran; and (ii) the remainder of said composition being a flavor adjuvant selected from the group consisting of methyl anthranilate, ethyl acetate, ethyl anthranilate, ethyl butyrate, ethyl methyl phenyl glycidate, cinnamic alcohol, amyl valerianate, cinnamyl propionate, rhodinyl acetate, methyl-beta-hydroxy butyrate and ethyl beta-hydroxy butyrate.

* * * * *

UNITED STATES PATENT AND TRADEMARK OFFICE
CERTIFICATE OF CORRECTION

PATENT NO. : 3,991,214
DATED : November 9, 1976
INVENTOR(S) : GARY SLANGAN, ALAN O. PITTET, CHRISTOPHER GIACINO, DENIS E. HRUZA, SR., AND EDWARD J. SHUSTER It is certified that error appears in the above-identified patent and that said Letters Patent are hereby corrected as shown below:

In the ABSTRACT, line 10, the word "benzoateeste" should read "benzoate-ester".

Signed and Sealed this

Nineteenth Day of April 1977

[SEAL]

Attest:

RUTH C. MASON
*Attesting Officer*

C. MARSHALL DANN
*Commissioner of Patents and Trademarks*